2,996,405
METHOD OF QUICK-SETTING PROTEIN-CONTAINING COATINGS
John H. Van Campen, Rochester, N.Y., assignor to Eastman Kodak Company, Rochester, N.Y., a corporation of New Jersey
No Drawing. Filed July 5, 1956, Ser. No. 595,810
5 Claims. (Cl. 117—34)

This invention relates to a method for the quick setting of protein coatings characterized in that a styrene-maleamic acid copolymer is employed in the composition and setting of the coating prepared therefrom is obtained by fuming said coating with gaseous ammonia.

In the applying of protein coatings from aqueous solutions thereof, the coating at the time of application is in liquid condition and in order to accomplish drying of that coating, it is desirable that it first be set. This is ordinarily accomplished in the case of gelatin compositions by immediately subjecting the liquid coating to a lowered temperature whereby the chilling of the coating causes gelling thereof. The coating may then be dried, such as by applying to the coating a current of warm dry air. In this chill-setting method, setting only occurs after the coating has been chilled to the setting temperature throughout. Where the chill-setting method is employed in paper coating, any delay in setting will result in penetration of the paper by the coating liquid. Also in the drying of chilled layers, it is necessary to guard against a somewhat elevated temperature in the drying air as the application of warmth may cause remelting. In the case of some types of coatings, chilling may be ineffective to cause setting of the coating applied.

U.S. Patent No. 2,652,345 of Jones describes a method for the quick setting of gelatin coatings in which formaldehyde is incorporated in the coating composition and the coating therefrom is set with gaseous ammonia. Oftentimes formaldehyde is not compatible photographically with certain emulsions and the use of that method might result in fogging therein. Also, in the Jones procedure even though the setting time is short, any procedure by which setting of the emulsion layer may be speeded up is desirable.

One object of my invention is to provide a method for the quick setting of protein coatings by means of styrene-maleamic acid polymers and ammonia. Another object of my invention is to provide a method for setting protein coatings in which the use of formaldehyde can be restricted or even dispensed with if desired. A further object of my invention is to provide a method of setting protein solutions which does not have any detrimental effect upon photographic emulsions or other photographic products prepared therewith. Other objects of my invention will appear herein.

I have found that by the adidtion of styrene-maleamic acid polymers to protein solutions it is possible to set coatings thereof rapidly by fuming the coatings prepared therefrom with gaseous ammonia without chilling being necessary and in fact, the use of an elevated temperature even facilitates the setting operation such as would be met with by the use of a current of warm dry air for the drying of the protein coating.

(1) COMPOSITION OF THE LIQUID

It is desirable that the liquid coating composition contain at least 3 percent of gelatin or other protein to obtain setting or gelling in accordance with my invention. If the coating is applied on an absorptive surface or the like, even more dilute protein solutions may be set by my method. As the concentration of protein decreases, the setting time increases. The 3 percent value is not critical but represents the minimum concentration for practical purposes. For convenience, the concentration of gelatin or other protein should be within the range of 3–10 percent as ordinarily concentrations above 10 percent will not result in any advantage over protein concentrations within the range given and may result in solutions having a viscosity which would make coating difficult.

(2) PROPORTION OF STYRENE-MALEAMIC ACID POLYMER IN THE COMPOSITION

The proportion of styrene-maleamic acid polymer used in the composition may be within the range of 1–5:20 (parts of polymer to parts of protein) the amount of polymer employed depending on the circumstances of use and the other conditions which obtain therein. It may be stated as a general rule that as the gelatin concentration in the coating composition increases, less of the polymer is needed to obtain the desired time of setting.

The styrene-maleamic acid polymers which I have found to be of value are those which are obtained by the copolymerizing of styrene and maleic anhydride and treating the product thus obtained with ammonia. Synthetic resins of the type which can be treated with ammonia to form a material suitable for use are referred to in U.S. Patent No. 2,047,398 of Voss et al. or German Patent No. 450,101. After the synthetic resin has been prepared, it is subjected to treatment with ammonia to form the desired product. For instance, the synthetic resin in finely divided form may be introduced into an aqueous solution of ammonia-water and held for a time until the amide or salt is obtained. This may be accomplished, for instance, by sifting comminuted resins into an aqueous solution of the ammonia or an amine and allowing the mass to stand for a time, such as overnight, whereupon the solid material is recovered as the ammoniated resin and is ready for use. Aqueous solutions of ammonia or amine of 20–30 percent concentration are ordinarily suitable for use in this connection although the concentration may be varied as desired.

(3) THE pH OF THE PROTEIN COATING COMPOSITION

When the styrene-maleic acid polymer is added to the protein coating composition, it is desirable that the pH of the composition be reduced to a value not more than 4.7. The pH value can be even lower if desired, the only criterion being that the pH is not so acid that the sytrene-maleamic polymer is hydrolyzed during the time it stands prior to use. Without acidification as specified, the viscosity of the coating solution is increased by the polymer composition. One satisfactory means of imparting acidity to the mass is by introducing dropwise and with vigorous stirring sulfuric acid either before, during, or after the addition of the styrene-maleic acid polymer to the protein solution. No apparent precipitation was observed when acid and the polymer were added to the gelatin simultaneously. However, this method has no advantage over that in which the polymer and the acid are added separately, provided, of course, care is used that the acid does not have a hydrolyzing influence on the polymer which is also added.

After the coating composition is prepared, it is preferable that the mass be allowed to stand for 30 minutes and that the coating be carried out before 90 minutes has passed; in some cases it has been found that the setting properties imparted to the coating composition by the polymer may even disappear after standing for 3 hours without use.

(4) THE CONCENTRATION OF NH₃ IN THE FUMING CHAMBER

In coating operations in accordance with my invention, the material to be coated, such as paper or film base, is run along and the coating composition is applied to the surface thereof. The thus-coated sheeting material is run directly into a fuming chamber wherein setting of the coating occurs, following which the coating is subjected to a current of warm dry air to remove the moisture therefrom. To obtain setting of the coating, it is necessary that more than 500 parts per million of $NH_3$ is present in the air of the fuming chamber and for the best practical operations it is desirable that the ammonia be within the range of 900–3500 p.p.m. With concentrations much below 900 p.p.m., the setting times are enough less that in practice the fuming chamber would need to be unduly lengthened or the rate of coating would have to be decreased.

(5) TEMPERATURE OF THE SURROUNDING GAS

In setting a protein such as gelatin in accordance with my invention, the system may be at normal temperature or the temperature thereof may be elevated such as up to as high as 150° F. I have found that an increase in temperature above normal may even cause some shortening of the setting time and therefore my procedure is readily adapted for use in coating operations wherein the coating is dried immediately at the time of setting or shortly thereafter, such as by means of a current of warm dry air. It is of course important in my coating operations that the ammonia gas be out of contact with the coating composition until it has been spread upon the surface to be coated.

(6) METHOD OF APPLICATIONS OF THE AMMONIA

The ammonia should be applied to the protein coating as soon as possible after that coating has been applied to the surface thereby avoiding any movement of the coating in relation to the surface to which it was applied. One method of applying the ammonia is to direct the ammonia gas so that it emerges directly over the coated layer immediately after coating. Any of the various known methods of contacting a gas with a coated surface can be employed for fuming protein coatings with ammonia gas in accordance with my invention.

I have found that my invention is useful for setting layers of gelatin which have been applied either clear or in dyed form to a supporting surface such as layers of .0005–.025 inch thickness. If desired, the gelatin composition may be in the form of a photosensitive silver halide emulsion or it may be in the form of a pigmented composition such as in the baryta coating of photographic paper base. I have found that my invention is particularly useful for setting photographic emulsions consisting of silver halide in a protein vehicle by coating out the composition and then setting the emulsion layer by fuming with ammonia gas. Setting of the emulsion layer is obtained without any decrease of temperature, that is, chilling is unnecessary. The photographic emulsion employed may have additives, such as sensitizers, antifoggants, or the like, therein and includes both washed and/or unwashed photographic emulsions. Although the addition of some formaldehyde to the composition is not excluded from the scope of my invention, my invention is particularly adapted to the avoidance of the use of formaldehyde in that the styrene-maleamic acid copolymer induces setting of the protein layer when ammonia gas is contacted therewith without the necessity of having formaldehyde present.

If desired, the gelatin or other protein employed in the coating composition may have been mixed with some other polymeric material compatible therewith. It is desirable, however, that the protein constitute at least 20 percent of the polymeric material and at least 3 percent of the coating composition. Some polymers which may be employed for mixing with protein, if that is desired, are resins such as styrene-butyl acrylate-methacrylamide as disclosed in Fowler application Serial No. 272,709, now Patent No. 2,739,137, polymers of acrylate gelatin with other monomers such as disclosed in Fowler and Gates application Serial No. 398,234, now Patent No. 2,853,457, or polymers such as acrylonitrile-ethyl acrylate resins (Rhoplex), acrylonitrile-butadiene resins, styrene-butadiene resins, styrene-butyl acrylates resins, etc.

One of the types of protein compositions to which my invention relates is photosensitive gelatin-silver halide emulsions. These emulsions are prepared by first dispersing silver halide in a peptizing agent and forming the emulsion therefrom using gelatin or some other protein as the vehicle. Other vehicles than gelatin which might be employed are soy protein, casein, blood albumen or their derivatives with acid chlorides, anhydrides, etc., particularly after these proteins have been subjected to treatment with hydrogen peroxide at an alkaline pH as disclosed in U.S. Patent No. 2,691,582 of Lowe and Gates.

Various other types of coating operations are included within the scope of my invention, such as the baryta coating of paper, the overcoating of photographic products or the application of clear protein coating upon a surface which acts as a support therefor.

The following examples illustrate my invention:

Example 1

69 parts of a 10 percent solution of photographic gelatin was diluted with 16 parts of water. While vigorously stirring, 14 parts of a 5 percent styrene-maleamic acid copolymer solution was added dropwise over a period of 4 to 6½ minutes. Later results have indicated that the polymer can be added in the form of a solution as a stream over a 45-second period. Immediately 1.2 parts of 6-normal sulfuric acid was added dropwise over a period of 30 to 60 seconds. The solution thus prepared had no visible precipitate and maintained a constant viscosity of 25 seconds for at least 5 hours at 40° C. Part of this solution was coated onto a film base at 40° C. at a thickness of 0.012 inch. The coating thus applied was set by gaseous ammonia, the setting occurring in 10 seconds. The second portion of the mixture was filtered and coated and was found to set within 10 seconds when gaseous ammonia was applied thereto.

Example 2

A gelatin coating composition was prepared as described in the preceding example. This solution was coated onto a cellulose acetate support at the rate of 3.5 pounds per 1000 square feet. The pH of the melt was 4.63. Various coating conditions were employed as follows:

A. The fuming chamber contained about 1850 p.p.m. of ammonia. The dry bulb temperature was 80° F. and the wet bulb temperature 59° F.

B. Conditions were the same as in A except the dry bulb temperature was 112° F. and the wet bulb temperature was 72° F. The coating here set and dried as well as in A.

C. The dry bulb temperature was 83° F., the wet bulb temperature 61° F. The same solution was used for coating except that it was first filtered. It was found that coating, setting and drying conditions were the same as in A.

D. Conditions were the same as in C except that the fuming chamber contained 900 p.p.m. of ammonia. The coating set and dried satisfactorily.

E. Conditions were the same as in D except that 500 p.p.m. of ammonia was supplied to the coating. It was found here that the ammonia strength employed was not sufficient to obtain satisfactory setting.

In all of the preceding sections of Example 2, the temperature of the circulating air near the fan was 138° F. and the temperature of the ammonia vapor in the distributing box was 127° F. The coatings were very satisfactory where the proper amount of ammonia was used and the setting was accomplished under the conditions given in approximately 10 seconds. The styrenemaleamic acid copolymer in addition seemed to act as a hardener upon storage as the coatings applied by the above procedure in which setting was obtained, were quite hard after they were held for three days at room temperature. Although susceptible to swelling, those coatings did not melt when treated with boiling water.

*Example 3*

There was added to 241.5 parts of a positive speed silver bromoiodide emulsion containing 23.4 parts of gelatin and .073 part of silver halide, 2.6 parts of a 7.5 percent aqueous saponin solution, 40 parts of a 5 percent aqueous solution of styrene-maleamic acid copolymer and 8 parts of 2-normal sulfuric acid. This addition took place by stirring the sliver halide emulsion at 40° C., adding the saponin and then adding the styrene-maleamic acid copolymer over a period of 30 seconds while continuing the stirring. The sulfuric acid was then added immediately over a period of 20 seconds. The mixture thus obtained was applied to a clear film support in a thickness of .006 inch and was set by applying a stream of ammonia thereto at 75° F. The setting was complete in 5 to 10 seconds. The coating was dried in a stream of warm dry air.

A second 241.5 part portion of the silver halide emulsion was melted at 40° C. and there was added thereto 2.6 parts of a 7.5 percent saponin solution, 5 parts of mucochloric acid and sufficient distilled water to make a total weight of 292 parts. This emulsion was coated onto a clear film support in a thickness of .006 inch. The coating was set by chilling and dried in a stream of air. Strips of each of the coatings were exposed at ½₅ of a second through a step wedge and developed for 4 minutes in Kodak Developer D-19. Both of these coatings were acceptable photographically and matched very well in speed and contrast.

The application of coatings in accordance with my invention may be made to any of the usual types of surfaces to which coatings are applied, such as paper, cellulose ester sheeting, glass, cloth, metal foil and the like. These coatings may be applied by any conventional method of applying coatings to such surfaces, such as, for instance, by dip coating or hopper coating. These layers may be multilayer color coatings containing incorporated colors such as are used to a considerable extent in color photography.

I claim:

1. A method of applying protein coatings to surfaces which comprises coating out onto a surface a solution in water, at a pH of not more than 4.7, of a water soluble protein of at least 3% concentration with quick setting enabler therein, which quick setting enabler consists of 5–20%, based on the weight of the protein, of a water soluble styrene-maleamic acid copolymer, and immediately fuming the resulting coating with geaseous ammonia whereby rapid setting of the coating is obtained.

2. A method of applying a protein-silver halide photographic emulsion to a support therefor which comprises coating out onto the surface of the support a composition at a pH of not more than 4.7 of at least 3% concentration of a water soluble protein containing silver halide particles therein in suspension and quick setting enabler, which quick setting enabler consists of 5–20%, based on the weight of the protein, of a water soluble styrene-maleamic acid copolymer, and immediately fuming the photographic emulsion coating with gaseous ammonia whereby rapid setting is obtained.

3. A method of coating which comprises applying to a surface a coating composition, at a pH of not more than 4.7, comprising gelatin in aqueous solution of at least 3% concentration having quick setting enabler therein, which quick setting enabler consists of 5–20%, based on the weight of the gelatin, of a water soluble styrene-maleamic acid copolymer, and immediately fuming the coating with gaseous ammonia whereby rapid setting is obtained.

4. A method of applying a gelatin-silver halide photographic emulsion onto a support therefor which comprises coating out onto a surface of the support an aqueous gelatin-silver halide emulsion at a pH of not more than 4.7, the gelatin being of at least 3% concentration, with quick setting enabler therein, which quick setting enabler consists of 5–20%, based on the weight of the gelatin, of a water soluble styrene-maleamic acid copolymer, and immediately fuming the resulting coating with gaseous ammonia whereby rapid setting is obtained.

5. A coating composition useful in the preparation of photographic products comprising an aqueous solution of gelatin of at least 3% concentration and a pH of not more than 4.7 with quick setting enabler therein, which quick setting enabler consists of 5–20%, based on the weight of the gelatin, of a water soluble styrene-maleamic acid copolymer.

References Cited in the file of this patent

UNITED STATES PATENTS

| | | |
|---|---|---|
| 2,047,398 | Voss et al. | July 14, 1936 |
| 2,313,565 | McDowell et al. | Mar. 9, 1943 |
| 2,451,370 | Alderson | Oct. 12, 1948 |
| 2,533,204 | Caldwell | Dec. 12, 1950 |
| 2,604,388 | Staehle | July 22, 1952 |
| 2,652,345 | Jones | Sept. 15, 1953 |
| 2,698,794 | Godowsky | Jan. 4, 1955 |
| 2,710,815 | Young et al. | June 14, 1955 |
| 2,735,768 | McFall et al. | Feb. 21, 1956 |
| 2,739,137 | Fowler | Mar. 20, 1956 |
| 2,763,552 | Van Campen et al. | Sept. 18, 1956 |
| 2,835,582 | Fowler et al. | May 20, 1958 |

OTHER REFERENCES

Clark: Abstract of application Serial No. 112,408, published September 29, 1953, 674 O.G. 1365.